United States Patent [19]
Palmenberg

[11] 3,757,424
[45] Sept. 11, 1973

[54] CLASSIFICATION GAGE FOR TURBINE VANES

[75] Inventor: Edward C. Palmenberg, Nanuet, N.Y.

[73] Assignee: Chromalloy American Corporation, Orangeburg, N.Y.

[22] Filed: Nov. 5, 1970

[21] Appl. No.: 87,059

[52] U.S. Cl. .............................................. 33/174 C
[51] Int. Cl. ............................................ G01b 5/20
[58] Field of Search ...................... 33/174 C, 174 S, 33/174 PA

[56] References Cited
UNITED STATES PATENTS
3,464,119  9/1969  Griggs.............................. 33/174 X Primary Examiner—Robert B. Hull
Assistant Examiner—Richard R. Stearns
Attorney—Sandoe, Hopgood and Calimafde

[57] ABSTRACT

The invention contemplates a gage for vane-class measurement, in which the vane is oriented in space, and in which class is determined by a single angular measurement. The angular measurement is taken about a longitudinal axis which may be considered to be substantially the trailing-edge gage line, and said measurement is made between (a) a radial strobe through substantially the mid-point of the airfoil gage line (along the convex surface of the blade of the vane) and (b) a radial strobe parallel to the orientation of one of the abutment edges of a buttress forming part of the vane. Various structural features enable simple and rapid one-handed manipulation of each successive vane into gaging position, so that the angular (class-indicating) measurement is fully repeatable for a given vane, and so that small and minor local anomalies in surface fidelity are substantially eliminated, i.e., they are not effective in degrading the reliability of the measurement.

13 Claims, 8 Drawing Figures

INVENTOR
EDWARD C. PALMENBERG

BY
Sandoe, Hopgood & Calimafde
ATTORNEYS

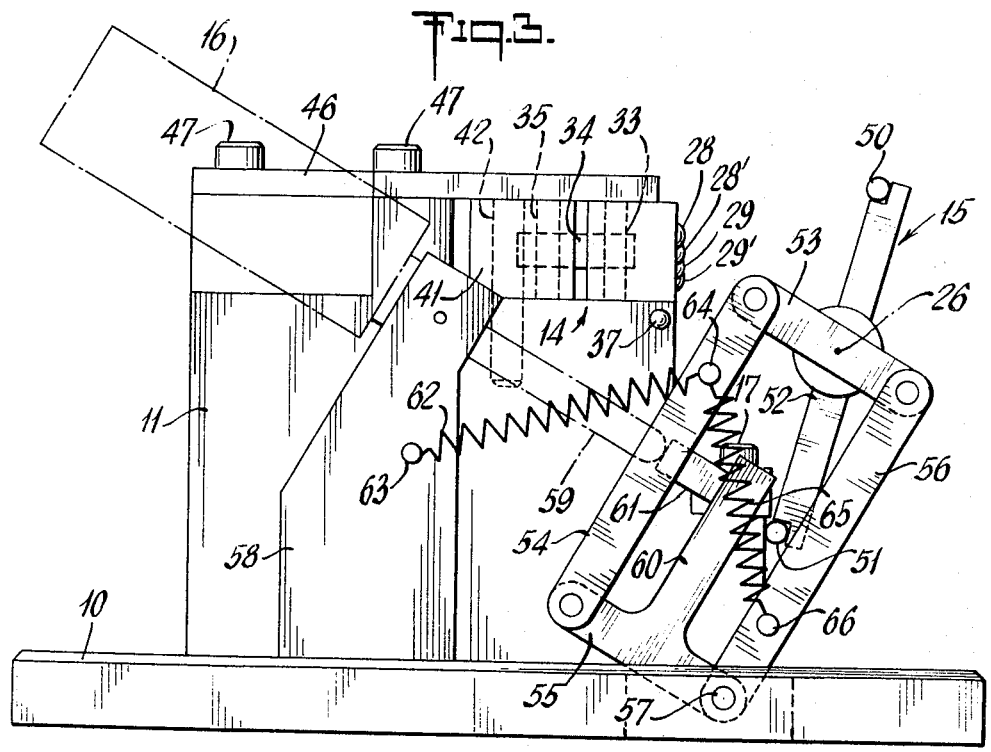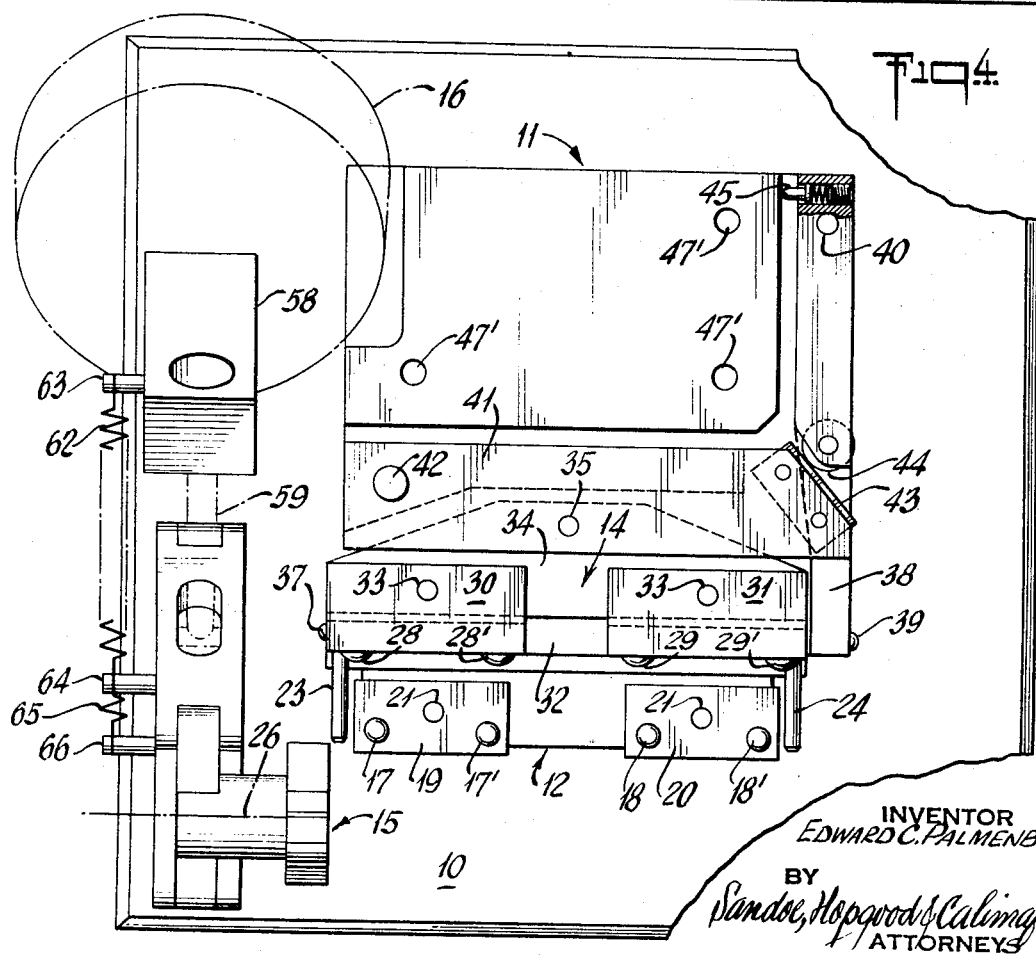

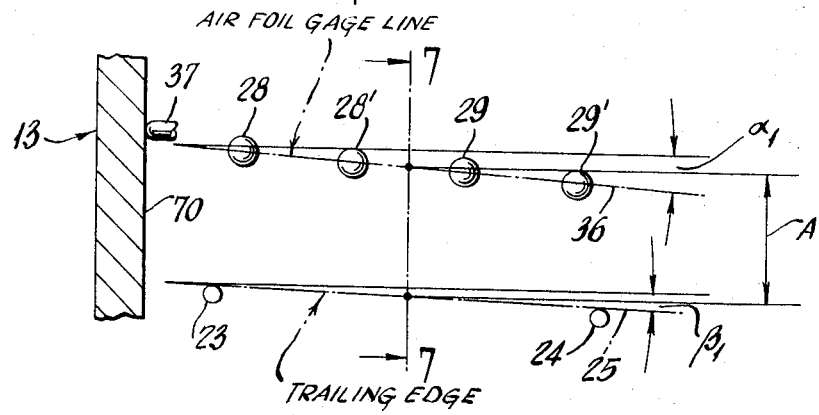
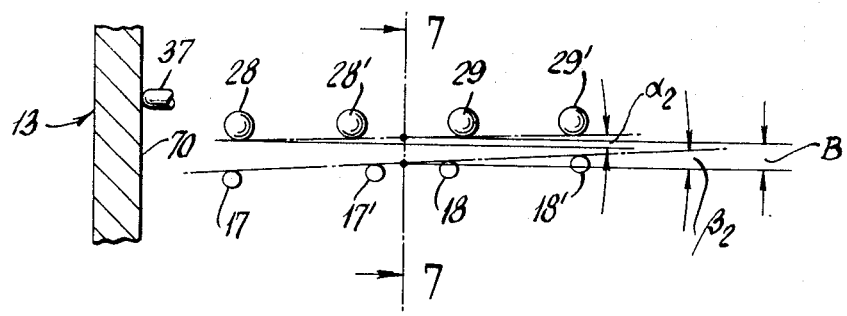
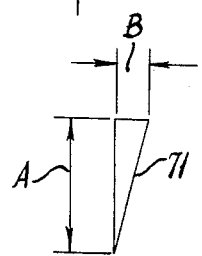 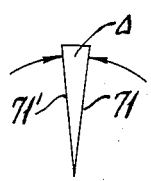
INVENTOR
EDWARD C. PALMENBERG
BY
Sandoe, Hopgood & Calimafde
ATTORNEYS

CLASSIFICATION GAGE FOR TURBINE VANES

This invention relates to gaging and measuring devices for observing adherence to dimensional factors critical to the performance of vanes in a turbine, such as the gas turbine of a jet aircraft.

Turbine-enging nozzle guide vanes or blades are subjected to rapid extremes of temperature and differential-pressure loading, and as a result the individual parts comprising a nozzle assembly become bent and otherwise distorted. Moreover, vanes which have seen service conditions, with accompanying deformation, are often repaired and reconfigurated by a hot-forming technique, and unless extreme care is exercised, this process can be another source of introducing deformation with respect to the mounting surfaces of the buttress system of the guide vane.

Such departures from "new" part dimensions may change the "class" of the vane when fitted into the support mechanism or shroud assembly, i.e., they may create a slightly changed angle of attack by the airfoil section or blade when the vane buttress has been assembled to the turbine stage.

Conditions are unsuitable for proper engine performance, if the reassembled shroud assembly for a given stage is not equipped with vanes of the correct class. Previous techniques for attempting a measurement of vane class have been unduly complex, and are of dubious value when entrusted to relatively unskilled workers.

The deformations and distortions which are deleterious to engine performance are various. But I have discovered certain critical factors lending themselves to simple separate observation and correction, as preliminaries to vane-class gaging, in order to critically determine the acceptability or not of a particular vane. Two such gages, for independent evaluation of blade twist and bow, respectively, are the subject of my pending patent applications, Ser. No. 25,506 and Ser. No. 31,286, respectively. The present invention is concerned with measurement of class, after taking such corrective measures as may have been dictated by gages of the type described in said patent applications.

It is an object of the invention to provide improved means for measuring or gaging a factor indicative of class, in vane structures of the character indicated.

Another object is to achieve the above object with a device which, for a given vane configuration, is sensitive essentially only and critically to the class factor.

It is a further object to provide means achieving the foregoing objects and utilizing as a basic reference one of the buttress-abutment surfaces relied upon in vane assembly into a given turbine stage, to thereby assure that all nozzle-throat areas between adjacent vanes in said stage will be substantially the same, within closely set tolerance limits.

A specific object is to achieve the foregoing with basically simple structure which lends itself to reliable use by relatively unskilled personnel and which enables the individual class-identification of each vane element, after reconditioning and before assembly into a turbine stage.

Another specific object is to provide instrumentation to achieve the foregoing and having the inherent capability of assuring products which equal or exceed the consistency and quality of newly manufactured vanes.

A further specific object is to provide such an instrument, with minimum chance of producing a degraded indication, due to such factors as mechanical hysteresis, local surface undulation in the blade, and deviations of blade length from a given norm.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIGS. 2, 3 and 4 are, respectively, front-elevation, left side-elevation, and plan views of the instrument of FIG. 1; the top cover plate being removed in FIG. 4, for better exposure of parts;

Figure 1:
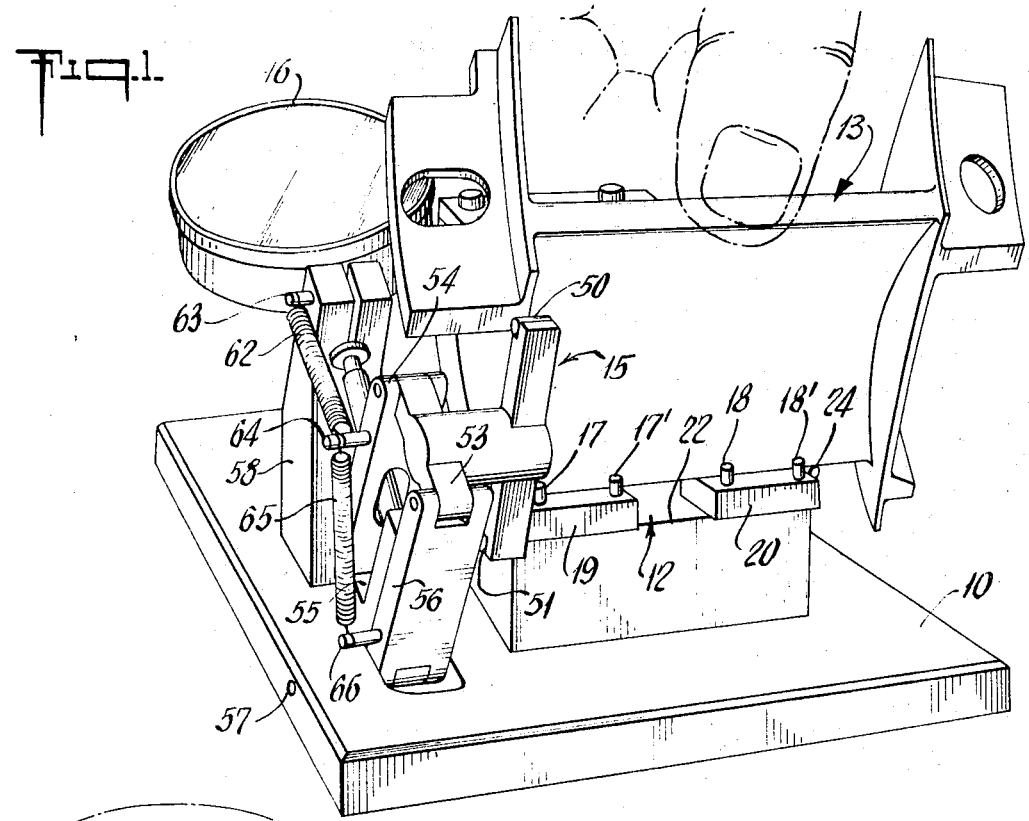
FIG. 1 is a view in perspective of a class-measuring instrument of the invention, with the general outline of a turbine vane positioned for the measurement.

FIGS. 5 and 6 are simplified schematic views, respectively taken in front-elevation and plan aspects, to illustrate relationships of important cooperative elements in the instrument of FIGS. 1 to 4; and FIGS. 7 and 8 are further simplified diagrams to illustrate relationships at the plane 7—7 of FIGS. 5 and 6.

Briefly stated, the invention contemplates a class-measuring instrument in which the blade of a turbine vane is oriented in space by contact at offset alignments, on gate lines of both the convex and the concave surfaces of the airfoil of the blade, and in which a buttress-abutment surface of the vane is used as a fixed reference by which to evaluate the orientation of the blade. The assumption is made that there has been prior correction of such factors as bow and twist in the blade to be evaluated, and the instrument reduces to insignificance certain apparently degrading factors, so that class evaluation by the instrument can have predictable meaning in the assembly of a turbine stage based on vanes which the instrument has identified as belonging to the vane class needed at such stage. Among the factors thus effectively compensated or neutralized in observing the instrument are (a) local undulations in blade surfaces along the airfoil gage line and along the trailing-edge gage line thereof, (b) mechanical hysteresis in moving parts of "stickiness" in an operator's application of the vane to the instrument, and (c) minor blade-length variations, as between successively observed vanes, it being noted that blade span may, for example, vary as much as 0.020 inch for a 3-inch blade span, within a given class spread.

Referring to the drawings, the invention is shown in application to a class-measuring instrument erected upon a fixed flat bed or frame 10 to be positioned upon or clamped to a suitable support, such as a bench or table. Fixed to the frame is an upstanding block 11 having a lower or ledge region 12 for supporting an applied turbine vane 13 along its trailing edge (concave surface of the blade) and having an upper region 14 for supporting the blade 13 substantially of the airfoil gate line (convex surface of the blade). In the course of achieving the orientation in space afforded by such supports, probe means 15 contacts an abutment surface of a buttress component of the vane, and in the thus-supported orientation, the probe indicator 16 is direct-reading in terms of class, or of a factor (such as an angle) directly related to class.

The trailing-edge support is in the form shown accomplished by spaced two-component elements which are orthogonally related and which establish a limited region of support for angular (i.e., effectively pivoted displacement of the applied vane 13, about an axis substantially along its trailing-edge region. Of these support components, first upstanding rods or bars 17–17' and 18–18' are carried by the ends of rocker arms or whiffle-tree elements 19–20, each of which has a floating connection to the frame block 11; a central vertical pin 21 establishes each such connection, allowing each arm 19–20 to derive support from the upper surface 22 of the ledge region 12, while freely pivotable about the vertical axis of its pin 21. The other support component may be established by a transverse rod, bar or ridge carried by each of the rocker arms 19–20, but preferably these further component-support elements are fixed to the frame, i.e., independent of arms 19–20. As shown, the further support elements are horizontal rods or bars 23–24 fixed to frame member 11 and projecting in widely spaced relation at least to the general vertical plane established by alignment of the rods 17–17'–18–18'. Rods 23–24 are positioned beneath the upper ends of rods 17–17'–18–18', and rods 23–24 clear the arms 19–20, thus allowing free floating action for arms 19–20 as they are caused to adapt to the contacting concave surface of the vane blade at the trailing-edge region.

In designing a gage of the present character to accommodate a particular vane pattern and size, the remaining support (at region 14) is offset vertically above and horizontally behind the general vertical plane of rods 17–17'–18–18', to the extent that, upon attainment of full support of the vane 13, the rods 17–17'–18–18' are each substantially tangent to the local trailing-edge curvature of the concave surface of the blade. Thus, by pressing the blade to urge the trailing edge thereof against the backsides of rods 17–17'–18–18', one can be substantially completely assured that the trailing-edge gage line of the blade has been referenced to the frame means 11. At the same time, gravity provides a natural assurance that the transverse rods 23–24 establish the same generally horizontal alignment of the trailing edge for each instance of such trailing-edge gage-line referencing.

Figure 2:
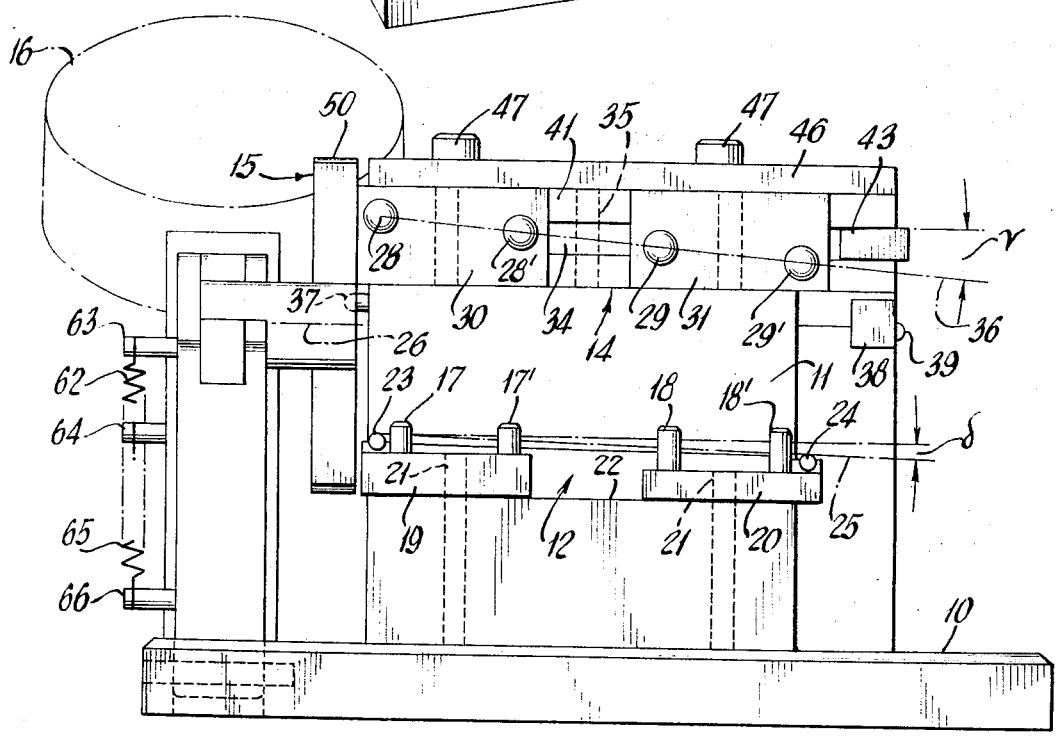

In many vane configurations, the general transverse plane of an end buttress will be inclined to (and, therefore, not strictly perpendicular to) the elongation of the blade; and since the angular measurement made by the instrument is preferably substantially in a plane parallel to the said plane, it is my preference that the rods 23–24 be so positioned as to define the particular trailing-edge supporting alignment 25 which will assure that the said generally transverse plane is vertical. This circumstance is illustrated in FIG. 2, wherein the projection of the "horizontal" support alignment 25 slopes down from true horizontal, to the extent δ, in order to optimize the accommodation of probe means 15 about horizontal axes, such as its own local central axis 26, parallel to pivot axes in the probe-suspension mechanism, as will later be more clear.

The support or stop against which the convex airfoil surface is positioned in the upper region 14 is, of course, basically referenced to the frame means 11. And it preferably makes its reference contact with the blade at some point or points along the airfoil gage line thereof. In the preferred form shown, this is accomplished by a two-stage differential rocker-arm or whiffle-tree construction, so devised as to enable four discrete point-contacts to be established with the airfoil gage-line region of the blade to be observed. The four point-contacts are provided by forwardly-projecting hardened ball elements 28–28'–29–29', fixed in local bores in rocker arms 30–31 which constitute one stage of the suspension. Arms 30–31 are slidable on the flat upwardly facing surface 32 of block 11, in the ledge region 14, and they are pivotally connected by pins 33 to opposite ends of a third rocker arm 34 which constitutes the second stage of the suspension; arm 34 derives its frame-based reference from a central pivot pin 35. Thus connected, the point-contacts 28–28'–29–29' are seen to be spaced on an alignment 36 to substantially match the airfoil gage line of an inserted vane 13; for the particular vane design accommodated, and as seen in FIG. 2, this alignment 36 slopes down from the horizontal, by an angular extent γ.

In addition to the described trailing-edge pivot and airfoil gage-line stops, means are provided (a) for accurate lateral positioning of the applied vane and (b) for corrective location of the pivot pin 35 in accordance with a determination of the net effective length (e.g., between buttresses) of the vane being observed. The first of these features is provided by a stop member, such as a rod element 37, fixed to frame means 11 and projecting laterally for intercepting contact with the inside wall surface of the adjacent buttress of the vane 13; thus, upon (a) setting the trailing edge as described at region 12, upon (b) urging the convex surface into abutment at 28–28'–29–29', and upon (c) also urging vane 13 to the right to the point of buttress-wall contact with stop 37, there will have been an unambiguous and repeatable orienting of the particular vane 13 in space, with perfect reference to the supporting frame means 11.

In accordance with a feature of the invention, the blade-length evaluation, and associated corrective positioning of the central pivot pin 35, and both accomplished automatically, in the course of positioning the vane as already described. An arm 38, having a laterally outwardly projecting buttress contact or probe 39 at one end, has pivoted connection to frame means 11 via a vertical pin 40 at the other end of arm 38. Arm 38 extends generally transverse to a further arm 41, having pivoted connection to frame means 11 via a vertical pin 42, located on the other side of the frame means 11 and remote from the central pin 35 by which it provides corrected frame-based reference for the two-stage suspension of contacts 28–28'–29–29'. Arms 38–41 have a cam-and-follower relationship, designed to achieve the desired corrective positioning of pin 35, in accordance with the buttress-to-buttress positioning of contacts 37–39; as shown, the cam 43 is a hardened insert carried by the free end of arm 41, and the follower is a roll 44 carried by arm 38 (between the pivoted and free ends thereof). A spring-loaded finger 45 at the heel of arm 38 reacts against part of the frame means 11 to normally lightly urge arm 38 clockwise, to cam arm 41 in a clockwise direction, and thus to normally position the contact system 28–28'–29–29' in slightly forwardly projected position; in this forward position, the space between buttress contacts 37–39 is less than is normally to be expected for inserted vanes 13. Now, when the operator inserts a vane 13 for observation, he makes sure to push the leading blades edge forward (counterclockwise, in the sense of FIG. 3) and against the slight resistive action of the spring finger 45.

Necessarily, after the contacts 28-28'-29-29' have differentially adapted to the airfoil gage-line region or alignment 36 of the vane 13, arm 41 is displaced to drive arm 38 counterclockwise, thus spreading the contacts 37-39 until arrested by abutment with the respective inner faces of the two buttresses. Once thus limited, the vane 13 is properly oriented for observation, appropriate correction having been made for its blade length (buttress-abutting distance between contacts 37-39). Specifically, the greater the measured length of the blade, the further inward pin 35 becomes located in its driven reference to frame means 11.

To complete the description of vane-support structure, it is apparent that the block or frame means 11, and the various interconnected arms (e.g., 30-31, 34, 41, 38, etc.) are recessed and sized to provide freedom for their individual described articulated movements. A top plate 46, bolted to the frame as by means 47-47', extends with suitable clearance over the described linkages, to retain and protect their freely pivoted connection.

Having established the accurate location of the blade of vane 13 in space, and in unambiguous relation to the frame means 11, the probe means 15 is operative to make the desired class measurement, as when the spaced contacts 50-51 at ends of the probe arm 52 firmly reference to the slope of the flat outer edge of the left buttress of vane 13. As shown, the probe arm 52 is a laterally offset integral part of one link (53) of a four-bar linkage 53-54-55-56, pinned at 57 to the frame (10) and on a horizontal axis. This linkage defines a parallelogram by which the buttress-referenced angular placement of arm 52 (link 53) is transposed to an outboard location, for evaluation by indicator 16. A fixed standard 58 clamps and positions the indicator 16 by its neck portion, so that the probe axis 59 of the indicator may track or respond to the various differences in angular positioning of an actuating arm 60; arm 60 forms an integral part of the link 55 and carries a projection 61 for indicator-probe contact in substantially the plane of the pins by which link 54 in integrated into the four-bar linkage, thus minimizing angularity effects in the translation of angular displacement (arm 60) to straight-line displacement of the indicator probe on its axis 59. If desired, a spring 62, between pins 63-64 on standard 58 and link 54, respectively, may be employed to normally urge the probe 15 into its buttress contact and orientation; also, if desired, a second (or diagonal) spring 65, between pins 64-66 on opposed links 54-56, may enhance the action.

In use, the probe means 15 is first manually retracted, against the spring action, to permit vane 13 to be inserted as described. Once vane 13 is firmly referenced in space, probe 15 can be released to seek its abutment and orientation, based on the adjacent vane-buttress edge. The indicator 16 now truly reads in terms of angle about the rocking-displacement axis (trailing edge) of the vane 13, corrected of course by the above-noted blade-length or span evaluation. The angular measurement may, with suitably calibrated graduations at the indicator display face, by direct-reading as to vane class, based on the assumption that the longitudinally central airfoil section is the most sensitive and most representative section, as will be more clear from the following discussion in connection with FIGS. 5 to 8.

In FIGS. 5 and 6, the longitudinally central airfoil section of the blade of vane 13 is at the plane 7—7, being parallel to the basic buttress reference plane 70, namely, the inner (buttress) surface which is positioned by abutment with the fixed lateral stop 37. For this plane 70 to be perpendicular to the articulation pivot axes of the four-bar system 53-54-55-56, and for the particular vane 13 under consideration, the airfoil gage line 36 and the trailing edge have orientations characterized by slight departures from normals to the plane 70. The elevation and plan views of FIGS. 5 and 6, respectively, display the vertical and horizontal components ($\alpha_1$, $\alpha_2$) of this departure for the airfoil gage line 36; they also display the corresponding components ($\beta_1$, $\beta_2$) of the corresponding departure for the trailing-edge alignment 25.

Now, by observing the situation at the longitudinal mid-section plane 7—7 (parallel to plane 70), there are seen to be a vertical component A and a horizontal component B of the slope which characterizes the local offset of the airfoil gage-line intercept with respect to the local trailing-edge gage-line intercept. The sloping line or strobe, connecting these two intercepts, is identified 71 in FIG. 7. It is the varying slope of this imaginary line or strobe 71 (i.e., varying from one to another of the various inserted blades 13) which is observed, in relation to the buttress slope determined by probe means 15, and which is the basis of measurement in my device. Such variation is suggested by FIG. 8, wherein an angular increment Δ has been observed between the slope line or strobe 71 for a first vane 13 and the corresponding slope line or strobe 71' for a second vane 13. It will be understood that the second vane 13 might have the same slope line or strobe 71 as the first vane 13, but with a different buttress slope (probed at 15), to yield the same indicated displacement Δ between a reading (at 16) on the first vane 13 and the reading (at 16) on the second vane 13. These two different causes of the same reading difference Δ, as between observations on two successive vanes 13, are however of no moment, the point being that the instrument is evaluating an angle between parts of the vane, and is not evaluating anything with respect to the frame, even though support is derived from the frame. Also, due to the blade-span evaluation and correction inherent in operation of the described instrument, the same reading at 16 (class indication) may result from a first vane 13 which has a truly steeper angle of attack (with reference to its buttress system) than that of a second vane 13; in other words, the longer span of the first vane 13 as compared with that of the second may account for identical class determinations for these vanes. This is at it should be, because in ultimate assembly to the turbine stage, the factor which counts is throat area (in the nozzle defined by adjacent surfaces of adjacent blades), and the blade-span compensation provides a true area-sensitive measurement.

To give an example of the physical magnitude and meaning of the angle Δ, one design of vanes 13 tested by one of my instruments is accommodated by a gage-line offset having A and B components of 0.9045-inch and 0.1877-inch, respectively, and an incremental angular departure Δ of 10'45" between readings is indicative of one class shift; in other words, the average angular rotation per class is 0°, 10', and 45".

In constructing an instrument as described, the base and frame parts, pivot arms and rocker arms, are conveniently made of flat ground low-carbon steel. On the other hand, the abutment parts, such as insert rods, positioning studs and balls, pins, and cam insert 43 are made of tool steel, hardened for example to Rockwell C 58–60. The contact feet 50–51 of the work-contacting probe arm 52 are preferably hard parallel rod inserts, consolidated to arm 52 as by brazing within local end sockets or cut-outs (shown). The parts of the four-bar linkage are also preferably of such hard construction, and the linkage itself is designed to avoid twisting misalignment (i.e., deviation from parallel relation) of the pivot axes of the suspension; for example, link 54 may be a strap which is longitudinally slotted at its central region, to permit free and symmetrical thrust transmission from a centrally positioned actuator rod 61 to the centrally positioned probe axis 59, axis 59 and rod 61 being in the central vertical plane of the four-bar linkage.

The described instrument is found to reliably indicate class of each individual vane (of a given configuration) that has been reconditioned, straightened or rebuilt. When used after passing the preliminary gage tests, such as those contemplated in the said copending applications, the instrument meets the stated objects and will reliably serve in hundreds of thousands of operations, without noticeably wear. Each blade is readily manipulated into position; and the class measurement reading is simply made, yet it reflects great sophistication to assure reference reliance on the regions of most critical importance to a determination of ultimate gas-flow capability, and the output reading is relatively insensitive to local blemishes and distortions on the locating surfaces. Vanes which have passed and have been assembled according to the class readings of my instruments have exhibited preformance equal to or better than that of newly manufactured, previously unused, original products. All gaging or testing with the instrument may be performed by relatively unskilled personnel, on what amounts to almost a "go:no-go" basis for each observed vane.

While the invention has been described in detail for the forms shown, it will be understood that modifications and adaptations may be made without departure from the scope of the invention. For example, buttress-probing, shown to involve the means 15, may take its reference from another buttress or from another buttress surface, and the probing may utilize optical, magnetic or electric elements, including those which rely on spacing from, rather than contact with, the buttress surface that is used.

It will also be understood that references herein to "horizontal" and "vertical" are for convenience only, for identification of particular orthogonally related directions or component senses. Obviously, such terms are not limiting in the use of the invention, which is really only concerned with an angle measurement between parts of the vane 13 and in no sense with respect to vertical or horizontal axes.

What is claimed is:

1. Gage means for observing class in a turbine vane which comprises an airfoil blade having a span extending longitudinally between fixed outer and inner buttresses, said blade having a convex surface referenced to an airfoil gage line extending between said buttresses and having a concave surface referenced at its trailing edge to a trailing-edge gage line, one of said buttresses including a wall extending generally transverely of said blade at juncture thereto and having opposed substantially flat elongated abutment surfaces for nested abutment with corresponding adjacent surfaces of the next adjacent vane when in shrouded assembly about a turbine axis; said gage means comprising a rigid frame, trailing-edge support means carried by said frame at longitudinally spaced locations for stabilized support of the trailing edge of the vane, said support means at each of said locations comprising first and second elongated abutments that are generally transversely oriented with respect to each other and with respect to the axis of longitudinal spacing, the first abutments at said locations being substantially parallel to each other and the second abutments at said locations being substantially parallel to each other, whereby said trailing-edge support means affords an applied blade a limited region of angularly rockable displacement of the blade about a rocking axis substantially coincident with the trailing-edge gage line; a fixed stop longitudinally offset in a first direction from said support means and projecting from a part of said frame to intercept part of the inner wall of one buttress and thus determine a lateral location for rockable trailing-edge support; second stop means including blade-contacting means movably carried by said frame and offset from the rocking axis for contact with the convex blade surface, said second stop means also including a buttress contact movably mounted on said frame for engaging the inner wall of the other buttress, said blade-contacting means and said movable buttress contact being mechanically coupled for cooperative displacement so that the displaced position of one determines the displaced position of the other, and said offset being such as to position said blade-contacting means for localized contact with the convex blade surface substantially at the airfoil gage line thereof; and means for measuring with respect to a predetermined reference on said frame the angular orientation of one of the abutment surfaces of one of the buttresses, when the blade is limited in said rocking displacement, upon contact by the movable buttress contact with the inner wall of the other buttress; whereby the measured angle may be substantially indicative of class of vanes successively observed by aid gage means.

2. Gage means according to claim 1, in which said trailing-edge support means comprises spaced upwardly extending parallel abutment bars and spaced horizontally extending parallel abutment bars, all said bars extending generally transverse to the trailing edge, whereby a limited region of angular rocking displacement of the blade is afforeded by said trailing-edge support means.

3. Gage means according to claim 1, in which said movable buttress contact is mounted for displacement substantially normal to the inner wall of said other buttress.

4. Gage means according to claim 3, in which said second stop means includes a frame-pivoted linkage in the mechanical coupling of said blade-contacting means to said movable buttress contact.

5. Gage means according to claim 1, in which said blade-contacting means comprises rocker-arm means having two spaced blade-contacting elements which are aligned for localized engagement with the convex blade surface at points substantially along the airfoil gage line thereof, said mechanical coupling being from said movable buttress contact and including a movable member with a pivot connection to said rocker-arm means.

6. Gage means according to claim 5, in which a trailing-edge support means comprises rocker-arm means wherein the first elongated abutments at each of the longitudinally spaced locations of stabilized support are at spaced locations along said last-mentioned rocker-arm means, the pivot axes of both said rocker-arm means being substantially parallel.

7. Gage means according to claim 6, in which the rocker-arm means of said trailing-edge support means comprises two laterally spaced rocker arms, the spaced first elongated abutments at each of the longitudinally spaced locations of stabilized support being at the outer ends of each of said arms.

8. Gage means according to claim 7, in which said second elongated abutments are spaced parallel horizontal frame-based rods to provide a vertical component of trailing-edge support, said first elongated abutments being vertical pins carried at the respective ends of said two rocker arms to provide a horizontal component of trailing-edge support.

9. Gage means according to claim 5, in which said blade-contacting means comprises two laterally spaced rocker arms each having two spaced blade-contacting elements which are aligned for localized engagement with the convex blade surface at points substantially along the airfoil gage line thereof, said mechanical coupling including a third rocker arm having spaced pivotal connections to said first two rocker arms, and said movable member having a pivot connection to said third rocker arm.

10. Gage means according to claim 1, in which said means for measuring includes a buttress contacting bar having two spaced buttress-contacting elements, the direction of the effective spacing of said spaced buttress-contacting elements being in substantially a radial plane about the pivot axis.

11. Gage means according to claim 10, in which said buttress-contacting bar is part of an element of a quadrilateral four-bar linkage pivoted at one corner thereof to said frame.

12. Gage means according to claim 11, in which an angle indicator carried by said frame includes a probe tracking the instantaneous position of that element of said four-bar linkage which is opposite said bar element with said buttress contacting feature.

13. Gage means according to claim 1, in which said means for measuring includes buttress-contacting pivoted means on a frame-fixed pivot axis for self-adapting angular positioning by said one abutment surface of said one buttress.

* * * * *